Figure 1:
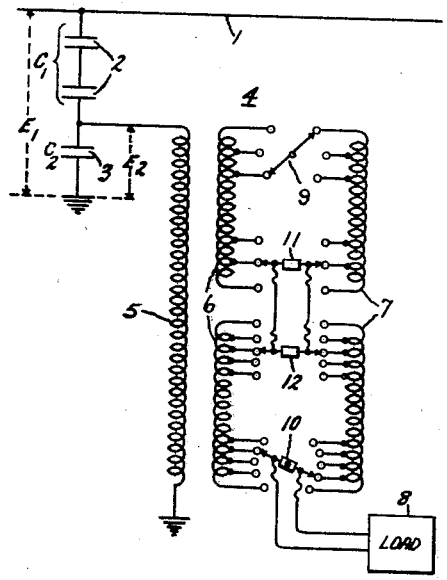

April 27, 1948.   J. W. FARR   2,440,540
TRANSFORMER
Filed Oct. 22, 1945

Inventor:
John W. Farr,
by Ernest C. Britton
His Attorney.

Patented Apr. 27, 1948

2,440,540

UNITED STATES PATENT OFFICE 2,440,540

TRANSFORMER

John W. Farr, Pittsfield, Mass., assignor to General Electric Company, a corporation of New York Application October 22, 1945, Serial No. 623,816

18 Claims. (Cl. 171—119)

This invention relates to transformers and more particularly to improvements in adjustable reactance transformers.

There are certain electric circuits in which it is desirable to be able to adjust both the reactance and the voltage independently of each other. One example of such a circuit is a so-called potential device circuit in which the voltage of a high voltage electric apparatus is reduced to a relatively low value relatively inexpensively by means of a capacitance potentiometer or voltage divider. In such circuits the voltage of the low voltage tap of the capacitance potentiometer is usually not exactly the same as the ultimate utilization voltage and therefore it is customary to interpose a potential transformer between the load and the low voltage tap of the potentiometer. It can be shown that the equivalent series capacitance of a capacitance potentiometer with respect to its load is equal to the sum of its two capacitances between its low voltage tap and its two other terminals, and in order to reduce the regulation of the potential device circuit it is customary to tune this circuit by making the inductive (leakage) reactance of the potential transformer equal to the equivalent capacitance of the potentiometer. Heretofore, adjustable transformers for such circuits have depended upon at least two auxiliary windings in addition to the main primary and secondary winding and, furthermore, for practical operation they have required the use of separate adjustable impedance elements, such as a resistor or a reactor or a capacitor or various combinations thereof, these elements being connected to the auxiliary windings of the transformer.

In accordance with this invention there is provided an improved adjustable transformer which, while useful for general purposes, is particularly well adapted for use in potential device circuits. This transformer is characterized by no more than three windings and requires no additional devices in the form of impedance elements for controlling and adjusting its reactance. The transformer has only two electric circuits, one being its primary circuit and the other being its secondary circuit and two of its three windings are serially connected in its secondary circuit and are relatively tightly and loosely coupled respectively with the remaining winding which is in the primary circuit. By suitably varying the effective turns of the different windings the reactance of the transformer can be changed at constant voltage ratio and in addition the voltage ratio of the transformer can be changed at constant reactance.

An object of the invention is to provide a new and improved electric transformer.

A further object of the invention is to provide a simple, efficient and inexpensive adjustable transformer which is particularly for use in potential device circuits.

A further object of the invention is to provide a transformer whose ratio can be adjusted at constant reactance and whose reactance can be adjusted at constant ratio.

The invention will be better understood from the following description taken in connection with the accompanying drawing and its scope will be pointed out in the appended claims.

Figure 5:
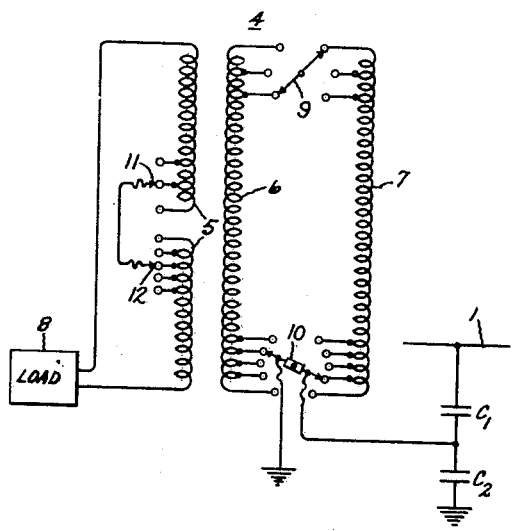
Figure 2:
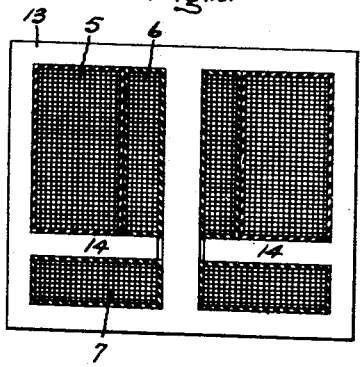
Figure 3:
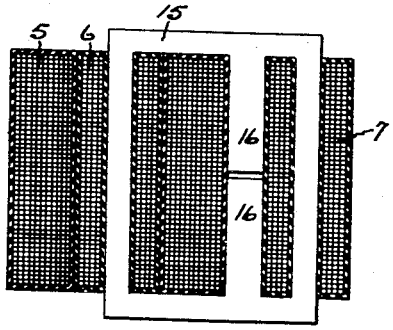
Figure 4:
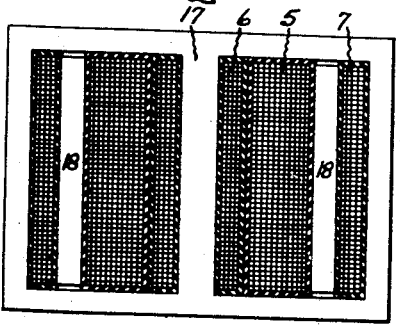

In the drawing, Fig. 1 illustrates diagrammatically an embodiment of the invention; Figs. 2, 3, and 4 illustrate various suitable structural arrangements of the core and coils for the transformer illustrated diagrammatically in Fig. 1, and Fig. 5 illustrates diagrammatically a modification of the invention.

Referring now to the drawing and more particularly to Fig. 1, a relatively high voltage circuit conductor, a reduced measure of whose voltage-to-ground is to be obtained, is indicated at 1. Connected between conductor 1 and ground is a capacitance potentiometer consisting, for example, of a plurality of serially-connected capacitance elements 2 and 3 between which there is a low voltage tap. As shown by way of example, element 2 consists of two capacitors and element 3 consists of one capacitor and if all of these capacitors have the same capacitance the voltage of the low voltage tap will be one-third the voltage of circuit 1.

For further stepping down the voltage and also for tuning the circuit there is provided an adjustable transformer 4 having a primary winding 5 and two secondary windings 6 and 7. The secondary windings are connected in series with each other to a load 8 which may be a relay or a measuring instrument. The secondary winding 6 is relatively closely coupled to the primary winding 5 and the secondary winding 7 is relatively loosely coupled to the primary winding 5 so that the latter has considerable reactance.

For adjusting the reactance of the transformer 4 and thus tuning the potential device circuit, the transformer 4 is provided with a pair of tap-changing switches 9 and 10. Switch 9 is a coarse reactance adjuster as it operates to change taps which are relatively widely spaced in the secondary windings, whereas tap switch 10 is a fine reactance adjuster as the taps with which it is associated are relatively closely spaced in the secondary windings. However, both adjusters 9 and 10 are similar in that as they are operated from one pair of taps to another pair they keep the sum of the turns in the two secondary windings 6 and 7 constant. In this manner the reactance of the transformer is varied without varying its voltage ratio.

As has previously been stated, the principal purpose of adjusting the reactance of the transformer 4 is to tune the potential device circuit. This tuning may be explained as follows: If $E_1$ is the voltage of line 1 to ground, $E_2$ is the no load voltage of the low voltage tap of the capacitance potentiometer to ground, $C_1$ is the capacitance of the portion 2 of the potentiometer between the line conductor 1 and the low voltage tap, and $C_2$ is the capacitance of the portion 3 of the potentiometer between the low voltage tap and ground, then $E_2$ is equal to $$\frac{C_1}{C_1+C_2} \times E_1$$

The reactance between line 1 and ground of the capacitance potentiometer is relatively very high in comparison to the impedance of the source of voltage $E_1$ and the conductors connecting it to the potentiometer. Therefore, so far as load current drawn from the potentiometer through its low voltage tap is concerned, the potentiometer circuit is equivalent to one in which capacitors $C_1$ and $C_2$ are connected in parallel with each other in a series circuit including a source of voltage $E_2$ and the primary winding 5 of the transformer 4. In other words, the equivalent capacitance $C_3$ of the potentiometer, so far as its regulation is concerned, is equal to $C_1+C_2$. By adjusting the reactance of transformer 4 so as to make it ohmically equal to $C_1+C_2$, the potential device circuit will have effectively zero reactance and therefore it will have very little regulation or voltage drop due to the current taken by load 8. Due to the manufacturing difficulty of making $C_1$ and $C_2$, which are usually the capacitance between grading or shielding surfaces in high voltage bushings or instrument transformers, of uniform value, it is not practical to use a fixed reactance value transformer in potential device circuits.

In order to make the load voltage any desired value within a reasonable range and also in order to compensate for manufacturing tolerances in $C_1$ and $C_2$, the transformer 4 is provided with means for adjusting its voltage ratio. As shown, two tap-changing switches 11 and 12 are provided for this purpose, switch 11 being a coarse ratio adjuster and switch 12 being a fine ratio adjuster. These switches, instead of pivoting about a central point as do switches 9 and 10, have a translatory motion so that they actually vary the sum of the effective turns in the secondary windings 6 and 7 and thus change the voltage ratio. Furthermore, they do this in such a manner as to maintain the reactance of the transformer constant. Specifically, they maintain the ratio of the effective turns of the windings 6 and 7 constant and ordinarily equal to the ratio of the respectve total turns of each of these windings. The windings 6 and 7 are actually multi-layer windings and their taps are so arranged that variations in their effective turns at constant ratio does not materially vary the space occupied by the active portions of these windings. In this manner the reactance of the transformer stays constant while its ratio varies.

The three windings of transformer 4 may be arranged in various ways on a magnetic core. For example, in Fig. 2 they are placed on a shell-type core 13, which core is provided with magnetic shunts 14 extending between its yoke portions and its central winding leg. Primary winding 5 and closely coupled secondary winding 6 are mounted concentrically on one part of the winding leg and the loosely coupled secondary winding 7 is mounted on the same winding leg but on the opposite side of the magnetic shunts from the primary winding and the closely coupled secondary winding 6. The magnetic shunts 14 thus provide a path for a relatively large amount of leakage flux from the secondary winding 7, thus giving this secondary winding a high reactance.

Another structural arrangement is shown in Fig. 3 in which a core-type core 15 is provided having magnetic shunts 16 extending between its two yoke portions. The primary winding 5 and the closely coupled secondary winding 6 are concentrically mounted on one of the winding legs of the core and the loosely coupled secondary winding 7 is mounted on the other winding leg of the core.

In the modification shown in Fig. 4 the core is a shell-type core 17 but its magnetic shunts 18 extend in the opposite direction from the shunts 14 in Fig. 2. Thus, these shunts are now parallel to the central winding leg instead of being at right angles to it as in Fig. 2. This enables all three of the transformer windings to be mounted concentrically with respect to the central winding leg but the shunts 18 are interposed between the loosely coupled winding 7 and the primary winding 5.

It will be noted that in Figs. 2, 3, and 4 none of the windings are placed on the magnetic shunt portions of the cores, thus making it relatively easy to construct and assemble these transformers.

In the modified circuit shown in Fig. 5 the coarse reactance adjuster 9 and the fine reactance adjuster 10 are the same as in Fig. 1 but the windings 6 and 7 now constitute the primary winding of the transformer. The ratio adjusting means remains in the secondary winding which is now the winding 5. However, the winding now has two sections which are serially connected by a coarse ratio adjuster switch 11' and a fine ratio adjuster switch 12'. In this manner the reactance of the transformer is adjusted by shifting the effective turns of its primary winding instead of its secondary winding, as in Fig. 1.

Although Figs. 1 and 5 show ground return circuits, it will of course be obvious to those skilled in the art that the invention is not limited to such circuits and that the entire potential device circuit can also be used with ungrounded circuits.

While there have been shown and described particular embodiments of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States, is:

1. A transformer comprising, in combination, a magnetic core, primary and secondary electric circuits each linking said core with a plurality of turns, switching means for varying the effective turns of one of said circuits for adjusting the reactance of said transformer at substantially constant ratio, and switching means for varying the effective turns of one of said circuits adjusting the ratio of said transformer at substantially constant reactance.

2. A transformer comprising, in combination, a magnetic core, primary and secondary electric circuits each linking said core with a plurality of turns, means for varying the effective turns of one of said circuits for adjusting the reactance of said transformer at substantially constant ratio, and means for differently varying the effective turns of the same circuit for adjusting the ratio of said transformer at constant reactance.

3. A transformer comprising, in combination, a magnetic core, primary and secondary electric circuits each linking said core with a plurality of turns, means for varying the effective turns of one of said circuits for adjusting the reactance of said transformer at substantially constant ratio, and means for varying the effective turns of the other of said circuits for adjusting the ratio of said transformer at substantially constant reactance.

4. An adjustable transformer for potential device circuits which is particularly adapted for connection between a capacitance potentiometer and a load comprising, in combination, a magnetic core, a magnetic shunt for said core, primary and secondary electric circuits each linking said core with a plurality of turns, said turns being grouped into a total of three windings none of which is on said magnetic shunt, and adjustable means which is exclusive of any separate impedance device for varying the effective number of turns of certain of said windings for adjusting the reactance of said transformer.

5. An adjustable transformer for potential device circuits which is particularly adapted for connection between a capacitance potentiometer and a load comprising, in combination, a magnetic core, a magnetic shunt on said core, primary and secondary electric circuits each linking said core with a plurality of turns, said turns being grouped into a total of three windings none of which is on said magnetic shunt, and adjustable means which is exclusive of any separate impedance device for varying the effective number of turns of certain of said windings for adjusting the reactance of said transformer at substantially constant ratio.

6. An adjustable transformer for potential device circuits which is particularly adapted for connection between a capacitance potentiometer and a load comprising, in combination, a magnetic core, a magnetic shunt on said core, primary and secondary electric circuits each linking said core with a plurality of turns, said turns being grouped into a total of three windings none of which is on said magnetic shunt, and adjustable means which is exclusive of any separate impedance device for varying the effective number of turns of certain of said windings for adjusting the ratio of said transformer at substantially constant reactance.

7. A transformer comprising, in combination, a magnetic core, primary and secondary electric circuits each linking said core with a plurality of turns, certain of said secondary circuit turns being more closely coupled to said primary circuit than others of said secondary circuit turns, and means for varying the number of both kinds of secondary circuit turns so as to vary the voltage ratio of said transformer at constant reactance.

8. A transformer comprising, in combination, a magnetic core, primary and secondary electric circuits each linking said core with a plurality of turns, certain of said secondary circuit turns being more closely coupled to said primary circuit than others of said secondary circuit turns, and means for inversely varying the effective number of both kinds of secondary circuit turns while keeping their sum constant so as to vary the reactance of said transformer at constant voltage ratio.

9. A transformer comprising, in combination, a magnetic core, primary and secondary electric circuits each linking said core with a plurality of turns, certain of said secondary circuit turns being more closely coupled to said primary circuit than others of said secondary circuit turns, means for varying the number of both kinds of secondary circuit turns so as to vary the voltage ratio of said transformer at constant reactance, and means for inversely varying the effective number of both kinds of secondary circuit turns while keeping their sum constant so as to vary the reactance of said transformer at constant voltage ratio.

10. An adjustable transformer for use with capacitance potentiometers comprising, in combination, a magnetic core, a primary winding thereon, a pair of serially-connected secondary windings thereon, said secondary windings being respectively tightly and loosely coupled to said primary winding, and means for inversely varying the effective turns of said secondary windings while keeping their total number of effective turns constant so as to vary the reactance of said transformer at constant ratio.

11. An adjustable transformer comprising, in combination, a magnetic core, a primary winding thereon, a pair of serially-connected secondary windings thereon, said secondary windings being respectively tightly and loosely coupled to said primary winding, and means for varying the effective turns of both secondary windings while keeping the ratio of said turns constant so as to vary the ratio of said transformer at constant reactance.

12. An adjustable transformer comprising, in combination, a magnetic core, a primary winding thereon, a pair of serially-connected secondary windings thereon, said secondary windings being respectively tightly and loosely coupled to said primary winding, means for varying the effective turns of both secondary windings while keeping the ratio of said turns constant so as to vary the ratio of said transformer at constant reactance, and means for inversely varying the effective turns of said secondary windings while keeping their total number constant so as to vary the reactance of said transformer at constant ratio.

13. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, and means for selectively connecting predetermined varying portions of said secondary windings in series so as to vary the reactance of said transformer while keeping its voltage ratio constant.

14. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, and separate coarse and fine means for selectively connecting predetermined varying portions of said secondary windings in series so as to vary the reactance of said transformer while keeping its voltage ratio constant.

15. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, and means for selectively connecting predetermined varying portions of said secondary windings in series so as to vary the ratio of said transformer while keeping its reactance constant.

16. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, and separate coarse and fine means for selectively connecting predetermined varying portions of said secondary windings in series so as to vary the ratio of said transformer while keeping its reactance constant.

17. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, means for selectively connecting predetermined varying portions of said secondary windings in series so as to vary the reactance of said transformer while keeping its voltage ratio constant, and means for selectively connecting predetermined varying portions of said secondary windings in series so as to vary the ratio of said transformer while keeping its reactance constant.

18. A transformer comprising a shell-type core, magnetic shunts associated with said core and extending between an intermediate point on the winding leg of said core and opposite yoke portions of said core, closely coupled primary and secondary windings on said winding leg on one side of said magnetic shunts, a loosely coupled secondary winding on said winding leg on the other side of said magnetic shunts, separate coarse and fine means for selectively connecting predetermined varying portions of said secondary windings in series so as to vary the reactance of said transformer while keeping its voltage ratio constant, and separate coarse and fine means for selectively connecting predetermined varying portions of said secondary winding in series so as to vary the ratio of said transformer while keeping its reactance constant.

JOHN W. FARR.

REFERENCES CITED

The following references are of record in the file of this patent:

UNITED STATES PATENTS

| Number | Name | Date |
| --- | --- | --- |
| 2,276,032 | Gibbs | Mar. 10, 1942 |
| 2,313,950 | Langguth et al. | Mar. 16, 1943 |
| 2,411,370 | Fries | Nov. 19, 1946 |

FOREIGN PATENTS

| Number | Country | Date |
| --- | --- | --- |
| 27,316 | France | Feb. 4, 1924 |